Nov. 21, 1967     W. A. BYRD     3,353,611
HARROW
Filed Feb. 23, 1965     2 Sheets-Sheet 1
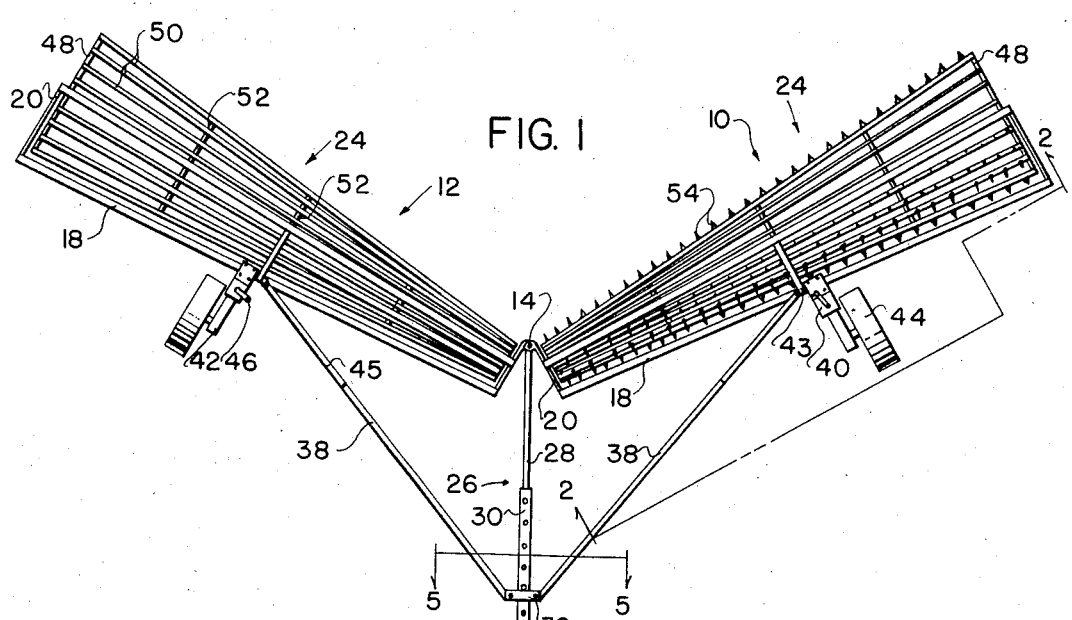
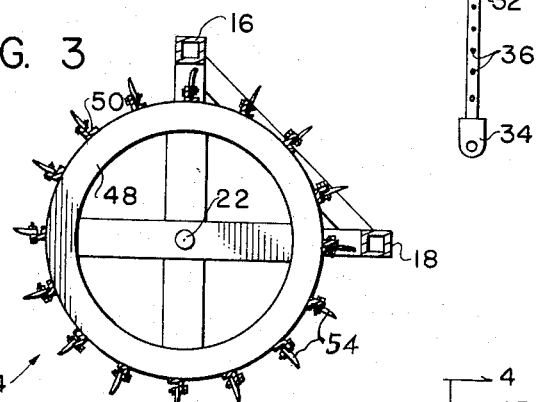
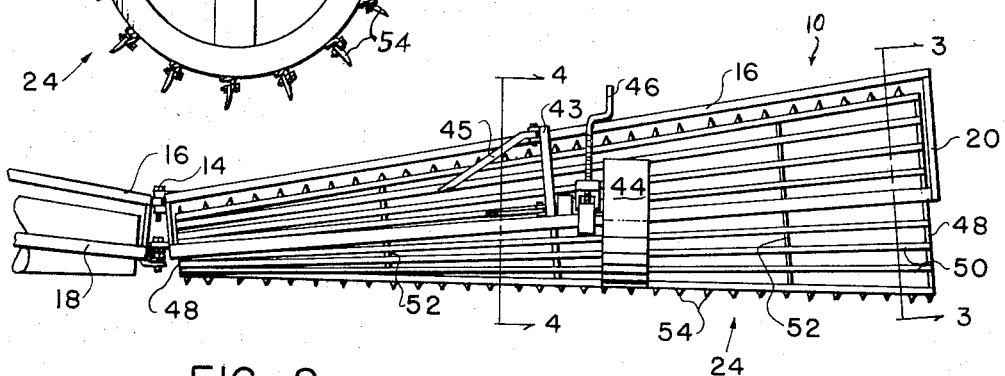
WYLIE A. BYRD
INVENTOR
BY Nov. 21, 1967   W. A. BYRD   3,353,611
HARROW Filed Feb. 23, 1965   2 Sheets-Sheet 2

WYLIE A. BYRD
INVENTOR.

BY

United States Patent Office 3,353,611
Patented Nov. 21, 1967

3,353,611
HARROW
Wylie A. Byrd, Rte. 2, Tulia, Tex. 79088
Filed Feb. 23, 1965, Ser. No. 434,470
11 Claims. (Cl. 172—240)

ABSTRACT OF THE DISCLOSURE

An earth working apparatus having two conical frustums with spikes thereon is mounted upon an articulated frame. The frame articulation is adjustable. The frame is provided with wheels for transportation.

---

This invention relates to agricultural implements and more particularly to a rolling harrow.

In agricultural practices it is often desirable to cultivate the upper few inches of the soil. This operation is commonly called harrowing. I have invented an implement to perform this task which is constructed of two conical frustums mounted to be drawn behind a draft implement. The frustums may be either aligned so that each is normal to the direction of draft or they may be each angled rearwardly from the direction of draft. If they are aligned, they pull very lightly requiring very little power to pull them over the ground. However, if they are angled to the rear they cultivate the ground to a much greater degree and consequently require more power to pull them.

In addition to cultivation or breaking up the clods, also, they will mulch the ground if there is plant debris present. I.e., the teeth of the harrow will pick up bits of straw and bring them to the surface of the ground as a mulch.

It may be seen that by pulling the frustum that there is a certain "twisting" action upon the harrow. I.e., the surface of the frustum is contacting the ground and the frustum is not allowed to curve and is forced to roll in a straight line. Therefore, the small end of the frustum tends to attempt to roll the axis of the frustum at a greater rotational speed than the large end of the frustum, resulting in a certain amount of tearing or ripping action of the teeth even when the two frustums are aligned. If the frustums are angled this tearing and ripping action is increased, because there is also an axial movement thereto.

An object of this invention is to provide a harrow for harrowing farm land.

Another object of this invention is to provide a multi-purpose harrow which will cultivate the soil, mulch the soil, or with different adjustment which will pick up and cultivate extremely lightly to prevent the sand from blowing after a rain. This is particularly important in Plains States, inasmuch as after a hard rain, if the soil is not quickly cultivated, that the land will blow. In this respect, my implement works very well as a sand fighter inasmuch as by simple adjustment it can be set so that it can be drawn at high speeds over many acres to cultivate sufficiently to prevent the sand from blowing.

Another object is to provide a harrow which can be made to harrow more deeply and cultivate more thoroughly or cultivate more lightly with a single simple adjustment.

A further object of this invention is to make harrow which can be loaded so that it pulls quite heavily without adding any weight to the harrow.

A further object of this invention is to make a harrow in which the teeth are self cleaning.

Still further object are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing the different views of which are not to the same scale, in which:

FIG. 1 is a plan view of a harrow according to this invention, without all the teeth being illustrated for clarity.

FIG. 2 is an elevational view partially in section of one section of the harrow taken on line 2—2 of FIG. 1 with the other section shown partially schematically, FIG. 3 is a sectional view of the harrow taken on line 3—3 of FIG. 2.

Figure 4:
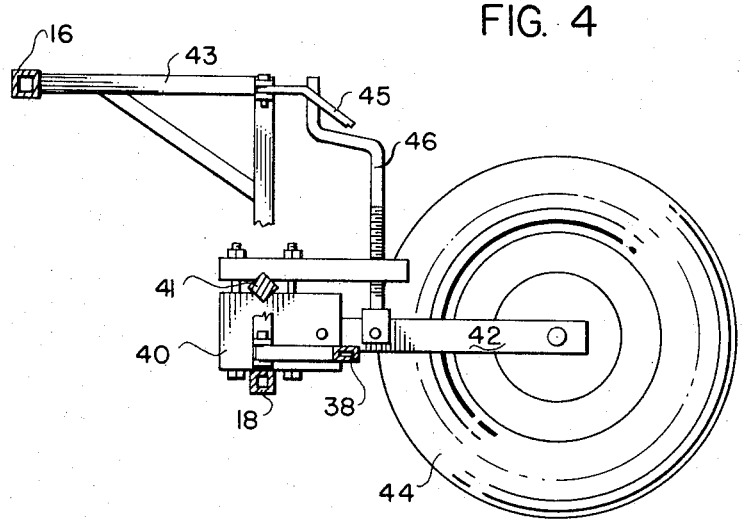
FIG. 4 is a sectional detail of the wheel bracket assembly taken on line 4—4 of FIG. 2, with parts broken and omitted for clarity.
Figure 5:
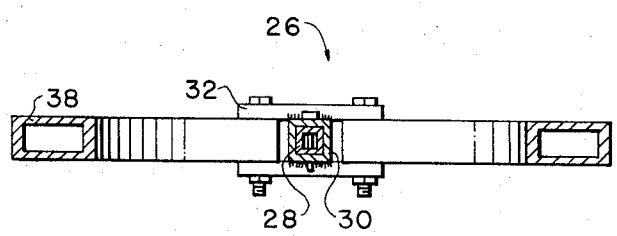
FIG. 5 is a sectional detail of the tongue's taken on line 5—5 of FIG. 1.

Referring more particularly to the drawings it may be seen that the harrow is built on the frame having two sections 10 and 12 articulated at the center of the harrow by pivot 14. Each section of the frame includes upper beam 16 and forward beam 18. The forward beam 18 and upper beam 16 are connected at each end by end assemblies 20, each of which also carries a bearing by which is supported shaft 22 at each of the ends of frustums 24. The end assemblies 20 have a large end and a small end. The small end is attached to the pivot 14. The pivot 14 is to the rear of the axis of the frustum as defined by the bearing and the shaft 22. By placing the pivot to the rear the small ends are quite close together. It would be apparent on analysis that the small ends of the frustums 24 would be quite close together regardless of the amount of the two frustums are angled rearwardly. It is important they be maintained as close together as possible so that there is a small amount of uncultivated soil between them as possible.

Tongue 26 is attached to the pivot 14. It extends forward therefrom. The tongue is composed of telescoped sections with a smaller section 28 telescoped within a larger section 30. The larger section has double hinge 32 attached thereto. The forward end of the large section 30 has hitch 34 attached thereto by which the tongue 26 may be attached to a draft vehicle (not shown) for drawing through the field.

The large and small sections 30 and 28 have a plurality of holes 36 therethrough. By the proper placement of a pin through some of the holes 36, the distance between the double hinge 32 and the pivot 14 may be adjusted. Tension bars 38 are pivoted at one end to the double hinge and at the other end to forward beam 18 adjacent the brackets 40 attached to the frame about midway of the section 10 and about midway of the section 12. Analysis will show that the harrow is primarily towed by the tension bars 38 and that the small section 28 of the tongue 26 does not tow the harrow so much as it maintains the angle of the harrow as set. This is the reason the brackets 40 are placed approximately about midway of the sections 10 and 12. If the attachment of the tension bars 38 were moved quite close to the small end of the frustums 24, the small section 28 of the tongue 26 would be in compression holding the mid-section at pivot 14 back. The small section 28 carries a small amount of tensions but the main force is transmitted to the sections of the frame 10 and 12 through the tension bars 38.

Each of the brackets 40 is clamped to stub shaft 41 which is welded to sub frame 43 which extends between beams 16 and 18. Brace 45 extends from the top of the sub frame 43 to the bar 38.

An arm 42 is pivoted to each of the brackets 40. The forward end of the arm 42 carries wheel 44 which is raised and lowered by crank screw 46. If the wheels 44 are in the up position the entire weight of the harrow rides upon the frustums 24. However, if the wheel is in the lower position the frustums are raised above the ground and then the harrow is readily transported to a different field. The wheels 44 are mounted so that they point straight ahead when the axes of the frustums 24 are aligned. Head 48 is attached on each end of each frustum 24. The heads have circular peripheries. Sixteen angle iron surface bars 50 are attached to the two ends and extend the full length of each of the frustums. Rings 52 within the bars 50 intermediate of the heads 48 provide support between the ends. The rings 52 are attached to the surface bars. Teeth 54 (only a few of which are illustrated for clarity) are bolted to the bars 50 at regular intervals. Therefore it may be seen that the frustums 24 are an open framework, i.e., that the teeth are supported with little or no backing and that there is no support for the frustums on the ground except for the teeth, so that there is no smoothing or rolling action of a roller pressing against the earth.

Also the teeth 54 are spaced evenly along each of the bars about eight inches apart so that there are as many teeth on one end of the drum as there are the other. Inasmuch as the head 48 on the large end of the frustum is about three times as large as the head 48 on the small end, the teeth are closer together circumferentially on one end than the other. However, measured longitudinally along the surface bars 50 they are equally spaced from one end to the other. Also, care is taken that, measured lengthwise, that the weight remains constant. I.e., the bars 50 with the teeth 54 are uniform from one end to the other and the head 48 at the small end contains as much metal as the head 48 at the large end. Therefore, the frustum is of uniform weight from one end to the other and the section of the frame 10 is uniform weight from one end to the other. This is important for the harrow to have the right action upon the ground. For example, if the large end were three times heavier than the small end, the large end would dig much deeper into the soil, and there would not be as much longitudinal movement of the teeth of the long end as there would be on the short end. This is because the short end would not have as much weight and it would ride higher and the teeth would slip easier along the ground. However, having the same weight from one end to the other, the teeth on the small end can dig into the ground just as much as the teeth on the large end with the result that there is a tearing, twisting action of the teeth at both ends. This action is minimized if the two frustums are aligned so that the axes of the frustums 24 are moving normal to the direction of draft. However, in any position the teeth are self cleaning and any straw, roots or other debris that otherwise would tend to hang and drag along the teeth 54 of the harrow are discharged. Also, there is an action which tends to bring the straw and other debris to the surface of the ground leaving a desirable mulch on the ground.

As stated before the amount of cultivation and draft on the vehicle can be adjusted by the adjustment of the angle of the two frustums by adjusting the hole 36 in which the pin is placed therefore adjusting the distance from the pivot 14 to the double hinge 32.

It will be apparent that the embodiment shown is only exemplary and that various modifications can be made in construction, materials, and arrangement within the scope of the invention as defined in the appended claims.

I claim as my invention:

1. An agricultural implement comprising:
(a) a frame having two sections
(b) articulated about a vertical axis at the center,
(c) a conical frustum mounted in each section of the frame,
(d) the small ends of the frustums adjacent to the point of articulation,
(e) each frustum constructed of an open frame work with longitudinal bars extending along the full length of the surface,
(f) a plurality of earth working teeth attached to each bar,
(g) a tongue attached to the frame at the point of articulation and extending forward of the frame,
(h) a double hinge on the forward part of the tongue,
(j) a tension bar extending from the double hinge to each section of the frame at about the middle of each section,
(k) means for adjusting the length of the tongue between the articulation and the double hinge so that the two sections may be adjusted between a position of alignment and a position of angling rearwardly from the point of articulation,
(m) the frustums together with the frame sections having the same weight for length ratio throughout their length,
(n) the bars having a uniform number of teeth per length throughout their length,
(o) a bracket on the frame section adjacent to the attachment of the tension bar to each of the frame sections,
(p) a wheel mounted on each of the brackets,
(q) and means for raising and lowering each of the wheels thus raising and lowering the frame sections for transportation,
(r) each frustum having bars extending along the surface,
(s) the teeth being spaced about eight inches apart on each bar,
(t) the large end of the frustums being about three times the size of the small end,
(u) the vertical axis about which the two sections are articulated being to the rear of the axis of the frustums.

2. An agricultural implement comprising:
(a) a frame having two sections
(b) articulated about a vertical axis at the center,
(c) a conical frustum mounted in each section of the frame,
(d) the small ends of the frustums adjacent to the point of articulation,
(e) each frustum constructed of an open frame work with longitudinal bars extending along the full length of the surface,
(f) a plurality of earth working teeth attached to each bar,
(g) a tongue attached to the frame at the point of articulation and extending forward of the frame,
(h) a double hinge on the forward of the tongue,
(j) a tension bar extending from the double hinge to each section of the frame at about the middle of each section,
(k) means for adjusting the length of the tongue between the articulation and the double hinge so that the two sections may be adjusted between a position of alignment and a position of angling rearwardly from the point of articulation,
(m) the frustums together with the frame sections having the same weight for length ratio throughout their length,
(n) the bars having a uniform number of teeth per length throughout their length,
(o) a bracket on the frame section adjacent to the attachment of the tension bar to each of the frame sections,
(p) a wheel mounted on each of the brackets,
(q) and means for raising and lowering each of the wheels thus raising and lowering the frame sections for transportation.

3. The invention as defined in claim 2, wherein
(r) there are sixteen bars extending along the surface of each frustum and
(s) the teeth are spaced about egiht inches apart on each bar.

4. The invention as defined in claim 2, wherein
(t) the large end of the frustum is about three times the size of the small end.
5. The invention as defined in claim 2, wherein:
(u) the vertical axis about which the two sections are articulated is to the rear of the axis of the frustums.
6. An agricultural implement comprising:
(a) a frame having two sections
(b) articulated about a vertical axis at the center,
(c) a conical frustum mounted in each section of the frame,
(d) the small ends of the frustums adjacent to the point of articulation,
(e) each frustum constructed of an open frame work with longitudinal bars extending along the full length of the surface,
(f) a plurality of earth working teeth attached to each bar,
(g) a tongue attached to the frame at the point of articulation and extending forward of the frame,
(h) a double hinge on the forward part of the tongue,
(j) a tension bar extending from the double hinge to each section of the frame at about the middle of each section, and
(k) means for adjusting the length of the tongue between the articulation and the double hinge so that the two sections may be adjusted between a position of alignment and a position of angling rearwardly from the point of articulation.
7. An agricultural implement comprising:
(a) a frame having two sections
(b) articulated about a vertical axis at the center,
(c) a conical frustum mounted in each section of the frame,
(d) the small ends of the frustums adjacent to the point of articulation,
(e) each frustum constructed of an open frame work with longitudinal bars extending along the full length of the surface,
(f) a plurality of earth working teeth attached to each bar, and
(g) a tongue attached to the frame at the point of articulation and extending forward of the frame,
(m) the frustums together with the same sections having the same weight for length ratio throughout their length,
(n) the bars having a uniform number of teeth per length throughout their length.

8. An agricultural implement comprising:
(a) a frame having two sections
(b) articulated about a vertical axis at the center,
(c) a conical frustum mounted in each section of the frame,
(d) the small ends of the frustums adjacent to the point of articulation,
(e) each frustum constructed of an open frame work with longitudinal bars extending along the full length of the surface,
(f) a plurality of earth working teeth attached to each bar,
(g) a tongue attached to the frame at the point of articulation and extending forward of the frame,
(o) a bracket on the frame section adjacent to the attachment of the tension bar to each of the frame sections,
(p) a wheel mounted on each of the brackets,
(q) and means for raising and lowering each of the wheels thus raising and lowering the frame sections for transportation.
9. The invention as defined in claim 6 wherein:
(u) the vertical axis about which the two sections are articulated being to the rear of the axis of the frustums.
10. The invention as defined in claim 7 wherein:
(u) the vertical axis about which the two sections are articulated being to the rear of the axis of the frustums.
11. The invention as defined in claim 8 wherein:
(u) the vertical axis about which the two sections are articulated being to the rear of the axis of the frustums.

References Cited

UNITED STATES PATENTS

| | | | |
|---|---|---|---|
| 437,124 | 9/1890 | La Dow | 172—604 X |
| 596,147 | 12/1897 | Edwards | 172—554 |
| 1,023,058 | 4/1912 | Younger | 172—553 |
| 1,149,414 | 8/1915 | Spross | 172—540 |
| 1,784,193 | 12/1930 | McOsker | 172—419 X |
| 2,195,899 | 4/1940 | Oetting | 172—553 |
| 2,711,680 | 5/1955 | Wright | 172—553 X |

ABRAHAM G. STONE, *Primary Examiner.*

ANTONIO F. GUIDA, *Examiner.*

J. R. OAKS, *Assistant Examiner.*